(12) United States Patent
Takasu

(10) Patent No.: US 10,556,444 B2
(45) Date of Patent: Feb. 11, 2020

(54) IMAGE PROCESSING APPARATUS AND NON-TRANSITORY COMPUTER-READABLE MEDIUM STORING IMAGE PROCESSING PROGRAM

(71) Applicant: BROTHER KOGYO KABUSHIKI KAISHA, Nagoya-shi, Aichi-ken (JP)

(72) Inventor: Masaya Takasu, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/897,317

(22) Filed: Feb. 15, 2018

(65) Prior Publication Data

US 2018/0236778 A1    Aug. 23, 2018

(30) Foreign Application Priority Data

Feb. 23, 2017    (JP) .................. 2017-031821

(51) Int. Cl.
| | |
|---|---|
| B41J 2/21 | (2006.01) |
| B41J 2/155 | (2006.01) |
| B41J 2/045 | (2006.01) |
| B41J 29/393 | (2006.01) |

(52) U.S. Cl.
CPC ......... B41J 2/2146 (2013.01); B41J 2/04558 (2013.01); B41J 2/155 (2013.01); B41J 29/393 (2013.01); B41J 2029/3935 (2013.01); B41J 2202/21 (2013.01)

(58) Field of Classification Search
CPC .... B41J 2/2146; B41J 2/04558; B41J 29/393; B41J 2/155; B41J 2029/3935; B41J 2202/21; G06K 15/027; H04N 1/6033
See application file for complete search history.

(56) References Cited

U.S. PATENT DOCUMENTS

| | | | |
|---|---|---|---|
| 2009/0244153 A1 | 10/2009 | Miyamoto | |
| 2009/0244154 A1* | 10/2009 | Miyamoto | ............ B41J 2/2139 347/15 |
| 2011/0148966 A1 | 6/2011 | Yoshida et al. | |

FOREIGN PATENT DOCUMENTS

| | | |
|---|---|---|
| JP | 2006-305958 A | 11/2006 |
| JP | 2009-234116 A | 10/2009 |
| JP | 2011-131428 A | 7/2011 |

* cited by examiner

*Primary Examiner* — Julian D Huffman

(74) *Attorney, Agent, or Firm* — Scully Scott Murphy and Presser

(57) ABSTRACT

There is provided an image processing apparatus including a controller configured to: acquire scan data indicating a scan image including first and second specific color areas each indicating a part thereof printed by using a first nozzle and a third specific color area indicating a part thereof printed by using a second nozzle; and generate a plurality of parameters, by using the scan data, each of the plurality of parameters indicating jetting characteristic of a coloring material from one of the first and second nozzles corresponding thereto. The controller evaluates the difference between a color of the first specific color area and a color of the second specific color area, and the controller generates a parameter included in the plurality of parameters and corresponding to the second nozzle, by using a result of the evaluation of the difference and a value of a third pixel within the third specific color area.

10 Claims, 9 Drawing Sheets

Fig. 10

CHARACTERISTIC VALUE TABLE PT

NOZZLES OF C INK

| NOZZLE NUMBER | CHARACTERISTIC VALUE |
|---|---|
| 1 | 5 |
| 2 | 2 |
| 3 | 1 |
| 4 | 4 |
| ⋮ | ⋮ |
| k-1 | 3 |
| k | 4 |

NOZZLES OF M INK

| NOZZLE NUMBER | CHARACTERISTIC VALUE |
|---|---|
| 1 | 3 |
| 2 | 1 |
| 3 | 3 |
| 4 | 5 |
| ⋮ | ⋮ |
| k-1 | 2 |
| k | 4 |

NOZZLES OF Y INK

| NOZZLE NUMBER | CHARACTERISTIC VALUE |
|---|---|
| 1 | 1 |
| 2 | 2 |
| 3 | 3 |
| 4 | 4 |
| ⋮ | ⋮ |
| k-1 | 5 |
| k | 1 |

NOZZLES OF K INK

| NOZZLE NUMBER | CHARACTERISTIC VALUE |
|---|---|
| 1 | 2 |
| 2 | 3 |
| 3 | 4 |
| 4 | 3 |
| ⋮ | ⋮ |
| k-1 | 4 |
| k | 2 |

IMAGE PROCESSING APPARATUS AND NON-TRANSITORY COMPUTER-READABLE MEDIUM STORING IMAGE PROCESSING PROGRAM

CROSS REFERENCE TO RELATED APPLICATION

The present application claims priority from Japanese Patent Application No. 2017-031821 filed on Feb. 23, 2017 the disclosure of which is incorporated herein by reference in its entirety.

BACKGROUND

Field of the Invention

The present invention relates to an image processing for a printing apparatus configured to perform printing by using a plurality of nozzles, and in particular, relates to an image processing for generating a parameter indicating jetting characteristic (discharging characteristic) of nozzles of the printing apparatus.

Description of the Related Art

There is known a printing apparatus configured to perform printing by using a plurality of nozzles. In such a printing apparatus, in a case that there is any variation or unevenness in a jetting amount of an ink (ink jetting amount) among the nozzles, any unevenness in the density (density unevenness) might occur in an image printed by the printing apparatus. For example, there is known a technique for printing a test pattern and causing a scanner to read the test pattern so as to calculate a correction value for correcting the density unevenness, based on a result of the reading of the test pattern by the scanner. There is such a possibility that the result of reading of a part or portion, of the test pattern, which is formed by certain nozzles which are included in the plurality of nozzles and which are located at an end of the head of the printing apparatus might be influenced by the background color of a sheet (sheet background color). Therefore, in this technique, the result of the reading of such a part or portion of the test pattern formed by the certain nozzles located at the end of the head of the printing apparatus is not employed.

SUMMARY

However, for example, depending on the kind of printing apparatus and/or the correction value to be calculated, there is such a possibility that it might be necessary to use the reading result which might be influenced by an area of the sheet background color. With respect to the above-described technique, there is such a possibility that any parameter indicating the jetting characteristic of the nozzles (for example, a correction value for correcting the density unevenness) might not be appropriately generated in such a case.

The specification of the present teaching discloses a technique capable of generating an appropriate parameter while taking the influence (effect) by the area of the sheet background color, in a case of generating the parameter which indicates the jetting characteristic of the nozzles by using the scan data.

The technique disclosed in the present specification has been made to solve at least a part of the above-described task.

According to an aspect of the present teaching, there is provided an image processing apparatus for a printing apparatus. The printing apparatus is configured to perform printing by using a plurality of nozzles, the plurality of nozzles being located at mutually different positions from each other in a first direction and the plurality of nozzles including a first nozzle and a second nozzle. The image processing apparatus includes a controller. The controller is configured to perform: acquiring scan data indicating a scan image; and generating a plurality of parameters corresponding to the plurality of nozzles, respectively, by using the scan data, each of the plurality of parameters indicating jetting characteristic of a coloring material from one of the plurality of nozzles corresponding thereto. The scan data is generated by optically reading a sheet on which a specific color image represented by a specific color has been printed by the printing apparatus. The specific color image is printed on the sheet by using a specific color image data indicating the specific color image. The scan image includes: a first specific color area, the first specific color area indicating a first part included in the specific color image and being printed by using the first nozzle, and the first specific color area being not adjacent, in a second direction corresponding to the first direction in the printing apparatus, to a background color area indicating a background color of the sheet; a second specific color area, the second specific color area indicating a second part included in the specific color image and being printed by using the first nozzle, and the second specific color area being adjacent to the background color area in the second direction; and a third specific color area, the third specific color area indicating a third part included in the specific color image and being printed by using the second nozzle, and the third specific color area being adjacent to the background color area in the second direction. In a case that the controller performs generating the plurality of parameters, the controller is configured to perform: evaluating difference between a color of the first specific color area and a color of the second specific color area based on a value of a first pixel within the first specific color area and a value of a second pixel within the second specific color area; and generating a parameter included in the plurality of parameters and corresponding to the second nozzle, by using a result of the evaluation of the difference between the color of the first specific color area and the color of the second specific color area and a value of a third pixel within the third specific color area.

According to the above-described configuration, the evaluation is performed regarding the difference between the colors of the two areas which are included in the specific color image and for which the printing is performed, by using the first nozzle, namely the evaluation is performed regarding the difference between the color of the first specific color area which is not adjacent to the background color area in the second direction and the color of the second specific color area which is adjacent to the background color area in the second direction. Further, the parameter for the second nozzle is generated by using the result of the evaluation and the value of the third pixel within the third specific color area which indicates the third part included in the specific color image and printed by using the second nozzle and which is adjacent to the background color area in the second direction. As a result, when generating a parameter indicating the jetting characteristic of a nozzle by using the scan data, it is possible to generate an appropriate parameter while considering the influence of the background color area of the sheet.

Note that the technique disclosed in the present specification can be realized in a various kind of aspects, including, for example, a multi-function peripheral, an image processing method, a recording medium storing a computer program for realizing the function of the apparatus or the method, etc.

BRIEF DESCRIPTION OF THE DRAWINGS

FIG. 10 is a view depicting an example of a characteristic value table PT.

DESCRIPTION OF THE EMBODIMENTS

<Configuration of Multi-Function Peripheral 200>

Figure 1:
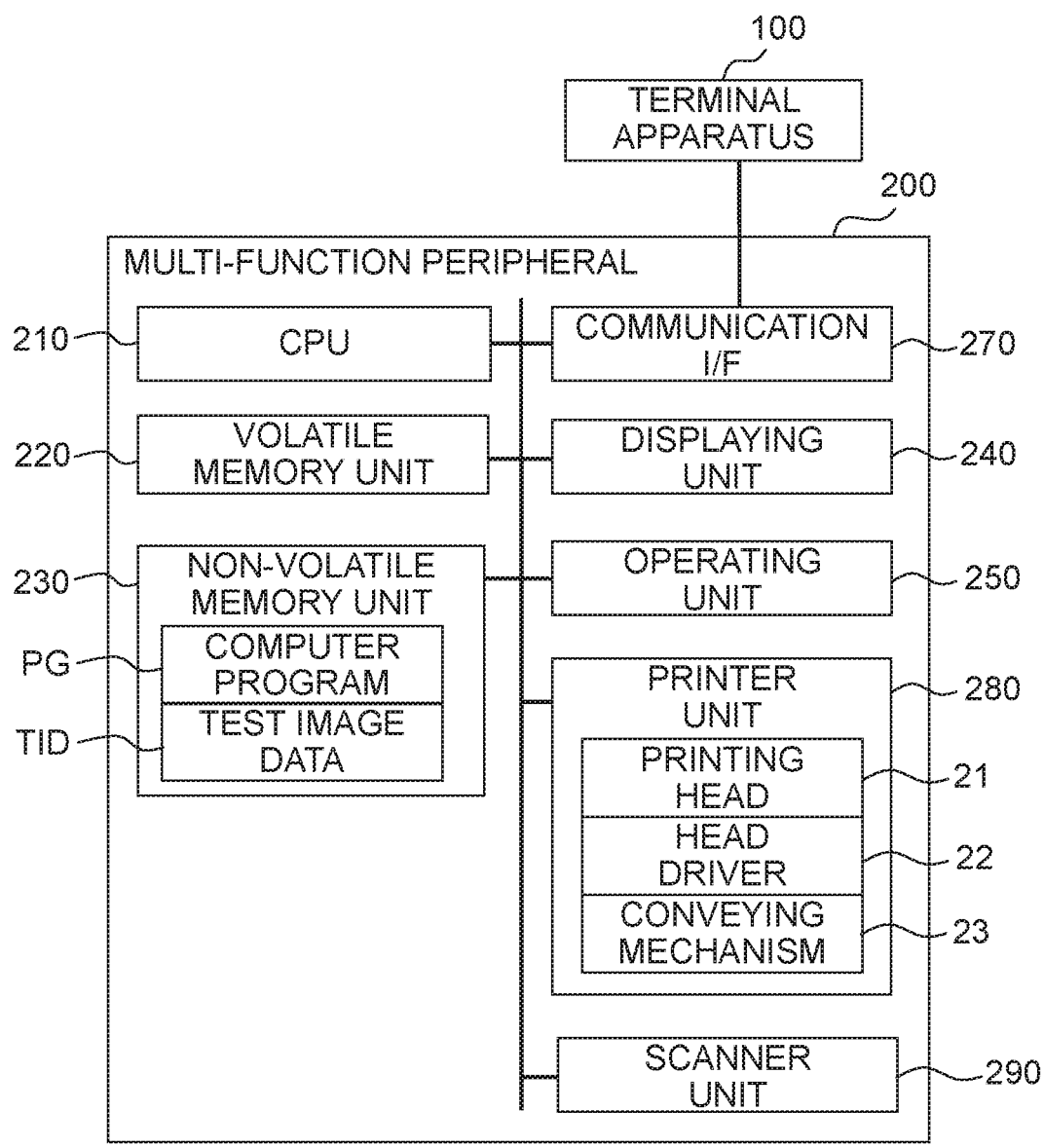
FIG. 1 is a block diagram depicting the configuration of a multi-function peripheral as an example of an image processing apparatus.

A multi-function peripheral 200 is provided with a CPU 210 which is a processor controlling the image processing apparatus, a volatile memory unit (storage unit) 220 such as a DRAM, a non-volatile memory unit 230 such as a flash memory, hard disk drive, etc., a displaying unit 240 such as a liquid crystal display, an operating unit 250 including a touch panel and/or a button overlaid onto the liquid crystal display, an interface (communication IF) 270 configured to communicate with an external device such as a terminal apparatus or device 100 of an user, a printer unit 280, and a scanner unit 290.

Figure 2:
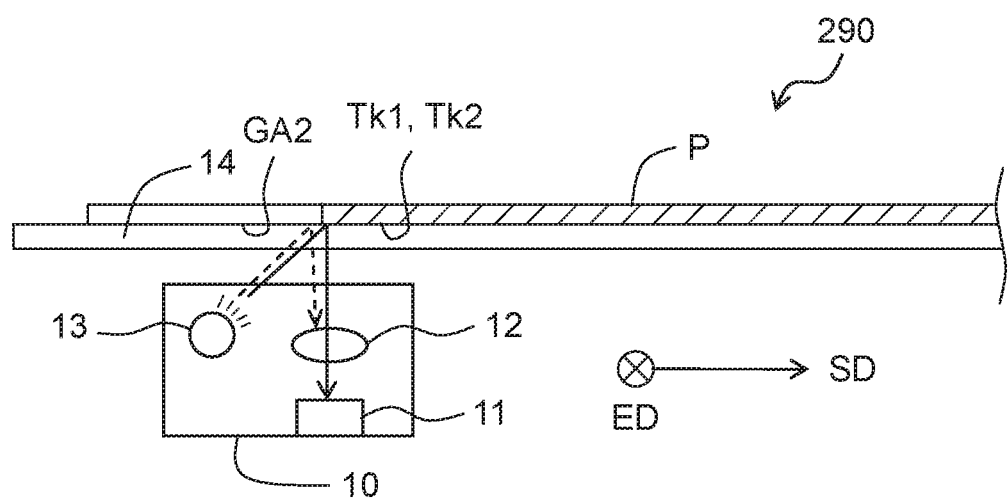
FIG. 2 is a view schematically depicting a scanner unit.

The scanner unit 290 generates scan data by optically reading a manuscript (original) P with an image sensor in accordance with control by the CPU 210. FIG. 2 is a view schematically depicting the scanner unit 290. The scanner unit 290 is provided with a platen glass 14 configured to have the original P placed thereon, and an image sensor 10 of the CIS (Contact Image Sensor) type. The image sensor 10 is provided with a plurality of photoelectric conversion elements 11 such as CCDs, CMOSes, etc., a lens 12, and a light source 13 including light emitting diodes (LEDs) of respective colors which are red, green and blue. The plurality of photoelectric conversion elements 11 are arranged in a row along an element arranging direction ED which is perpendicular to a reading direction SD (FIG. 2), and is a direction parallel to a surface, of the platen glass 14, on which the original P is placed (a direction from a front side to the far side or the back side of the sheet surface of FIG. 2).

The image sensor 10 is configured to move in a reciprocating manner to perform scanning along the reading direction SD by the motive power of a non-illustrated step motor. The image sensor 10 causes the light source 13 to light up while performing the scanning from one end toward the other end of the original P, and uses the plurality of photoelectric conversion elements 11 so as to output the strength of a reflected light off from the original P as an electric signal. In this situation, in the light source 13, control is performed such that the red, green and blue color LEDs are sequentially lighted. These lightings of the three color LEDs, namely, the red, green and blue color LEDs each one time generates an electric signal corresponding to an RGB value of a pixel for one line along the element arranging direction ED. The scanner unit 290 generates scan data indicating the original P based on the electric signal outputted by the image sensor 10. The scan data is an RGB image including the RGB values of a plurality of pixels. The RGB values indicate the colors of the respective pixels, respectively.

The printer unit 280 uses a plurality of kinds of inks in accordance with control by the CPU 210 to thereby print an image on a printing medium such as a paper sheet (paper), etc. In the embodiment, cyan (C), magenta (M), yellow (Y) and black (K) inks are used. The printer unit 280 is provided with a printing head 21, a head driver 22 and a conveying mechanism 23 (see FIG. 1). The conveying mechanism 23 is provided with a non-illustrated conveying motor, and is configured to convey (transfer) a printing medium such as a paper sheet in a conveying direction TD. The printing head 21 is provided with a plurality of nozzles NZ (to be described later on) along a nozzle direction ND crossing the conveying direction TD. The head driver 22 drives at least a part of the plurality of nozzles NZ, and discharges the ink(s) from at least the part of the plurality of nozzles NZ onto the recording medium which is being conveyed by the conveying mechanism 23 to thereby form dots thereon.

Figure 3:
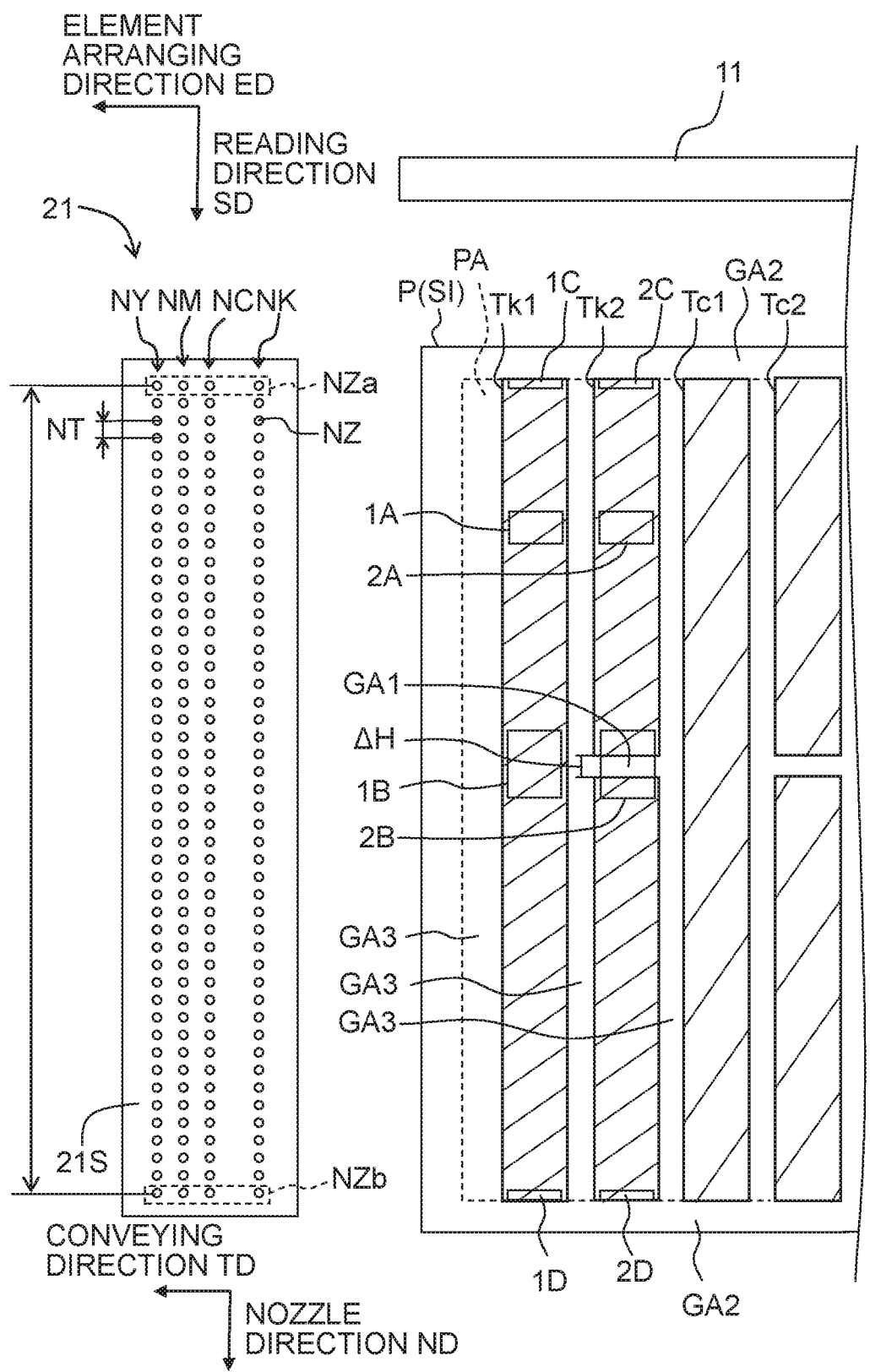
FIG. 3 is a view depicting a printing head and a paper (paper sheet) P as a printing medium.

FIG. 3 is a view depicting the printing head 21 and a paper sheet P as the printing medium. The plurality of nozzles NZ arranged on a nozzle arrangement surface 21S of the printing head 21 form nozzle arrays NC, NM, NY and NK jetting (discharging) the respective C, M, Y and K inks, respectively. Each of the nozzle arrays includes k pieces ("k" is an integer not less than 2) of the nozzle NZ. The k pieces of the nozzle NZ are located at mutually different positions in the nozzle direction ND, and is arranged or aligned along the nozzle direction NZ at a predetermined nozzle interval NT. In this embodiment, the nozzle interval NT is an interval (spacing distance) corresponding to 600 dpi. The present teaching is not limited to such an aspect, and the nozzle interval NT may be set appropriately. For example, the nozzle interval NT may be as an interval corresponding to 300 dpi, 1200 dpi, etc.

A length in the nozzle direction ND from a nozzle Nza at one end in the nozzle direction ND to a nozzle NZb at the other end in the nozzle direction ND among the k pieces of the nozzle NZ included in each of the nozzle arrays is determined as a nozzle length NL. The nozzle length NL is same as a length, of a printable area PA in the paper sheet P, in a direction corresponding to the nozzle direction ND. As described above, the printer unit 280 of the present embodiment executes the printing without moving the printing head 21 in the direction crossing the conveying direction TD. Namely, the printer unit 280 is a so-called line printer without any main scanning.

The volatile memory unit 220 provides a buffer area temporarily storing a variety of kinds of intermediate data generated in a case that the CPU 210 executes a processing. The non-volatile memory unit 230 stores a computer program PG and test image data TID therein. The computer program PG is a control program for allowing the CPU 210 to control the multi-function peripheral 200. The test image data TID is image data indicating a plurality of test images (to be described later on). In this embodiment, the computer program PG and the test image data TID are provided in such an aspect that the computer program PG and the test image data TID are previously stored in the non-volatile memory 230 when the multi-functional periphery 200 is produced. Instead of the above-described aspect, the computer program PG and the test image data TID may be provided in such an aspect that the computer program PG and the test image data TID are downloadable from a server, or storable in a DVD-ROM, etc. The CPU 210 is capable of executing the computer program PG to thereby execute an image processing including: printing of the test image, generation of the scan data indicating the original P including the test image, generation of a characteristic value using the scan data, and the like.

<Image Processing>

Figure 4:
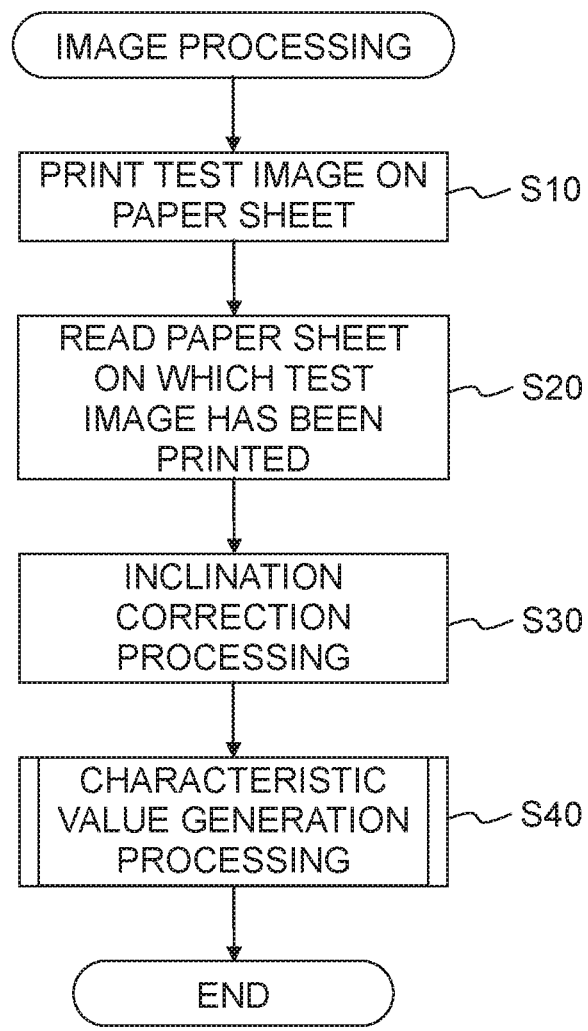
FIG. 4 is a flow chart of an image processing.

An image processing depicted in FIG. 4 is a processing, regarding each of (4×k) pieces of the nozzle NZ as described above, for acquiring a characteristic value (also referred to as a "parameter") indicating the ink jetting characteristic of each of the (4×k) pieces of the nozzle NZ. A specific characteristic value indicating the ink jetting characteristic by a specific nozzle NZ among the (4×k) pieces of the nozzle NZ is referred to as a characteristic value corresponding to the specific nozzle NZ. Although the plurality of nozzles NZ are designed so as to jet the ink in a predetermined target amount, there is a variation or unevenness in an actual jetting amount of the ink among the nozzles NZ due to, for example, any variation in the size among the nozzles NZ, any variation among ink flow channels of the ink and/or actuators corresponding respectively to the nozzles NZ, etc. The acquired characteristic value is used, when generating printing data to be used for the printing, so as to suppress any density unevenness which might be generated in a printed image due to any variation in the ink jetting amount among the nozzles NZ. This image processing is executed, for example, when the multi-function peripheral 200 is manufactured based on an instruction of the manufacturer. Instead of this, it is also allowable that the image processing is executed, after the multi-function peripheral 200 has been sold, based on an instruction of a user of the multi-function peripheral 200.

In step S10 of the flowchart of FIG. 4, the CPU 210 uses the test image TID to print a plurality of test images. The plurality of test images include two test images for one kind of the ink. Namely, in a case that the number of the kind of the ink to be used in the printer is n piece(s) ("n" is an integer not less than 1), the number of the plurality of test images is (2×n) pieces. In this embodiment, since the four kinds of ink, namely, the C, Y, M and K inks are used (n=4), 8 pieces of test image (8 test images) are printed. FIG. 3 depicts two test images Tk1 and Tk2 corresponding to the K ink and two test images Tc1 and Tc2 corresponding to the C ink among the 8 test images already printed on the paper sheet P.

The left-right direction of FIG. 3 is a direction parallel to the conveying direction TD in which the paper sheet P is conveyed when the plurality of test images are printed on the paper sheet P. The up-down direction of the paper sheet P in FIG. 3 is a direction parallel to the nozzle direction ND of the printing head 21 which passes over the paper sheet P which is being conveyed in the conveying direction TD when the plurality of test images are being printed on the paper sheet P. As described above, the left-right direction of the paper sheet P in FIG. 3 is a direction corresponding to the conveying direction TD. In the following explanation, the left-right direction of the paper sheet P in FIG. 3 is referred also to as a conveyance corresponding direction. The up-down direction of the paper sheet P in FIG. 3 is a direction corresponding to the nozzle direction ND. In the following explanation, the up-down direction of the paper sheet P in FIG. 3 is referred also to as a nozzle corresponding direction.

The above-described 8 test images are each a band-shaped rectangular area of which longitudinal direction is along the nozzle corresponding direction. The 8 test images are arranged along the conveyance corresponding direction.

The two test images Tk1 and Tk2 corresponding to the K ink are used to generate k pieces of characteristic values respectively corresponding to the k pieces of the nozzle NZ jetting the K ink. Similarly, test images corresponding to the C, M, Y inks, respectively, are each used to generate characteristic values respectively corresponding to nozzle NZ jetting one of the C, M and Y inks.

The test image Tk1, as a first test image for the K ink, is printed by using all the k pieces of the nozzle NZ jetting the K ink, and without using the nozzles NZ jetting the C, M and Y inks different from the K ink. Accordingly, the first test image Tk1 after the printing has a band-like shape extending from one end to the other end in the nozzle corresponding direction of the printable area PA of the paper sheet P. The first test image Tk1 is printed by using a uniform first test image Tk1 which is a first partial image data included in the test image data TID and which has a specified color having a predetermined target brightness (luminance) (in a case of the K ink, for example, grey of a predetermined brightness). Namely, the first test image Tk1 is printed by using the first partial image data indicating a first test image Tk1 composed of the specified color.

The printed second test image Tk2 has also a band-like shape extending from the one end to the other end in the nozzle corresponding direction of the printable area PA of the paper sheet P, similarly to the first test image Tk1. Note that, however, the printed second image Tk2 is divided into two parts with a blank area GA1 in which any image is not printed, namely, which indicate the background color of the paper sheet P, intervened between the two parts, unlike the printed first test image Tk1. A length ΔH in the nozzle corresponding direction of the blank area GA1 is, for example, in a range of several mm to several cm; in this embodiment, the length ΔH is, for example, in a range of 5 mm to 1 cm. The blank area GA1 is located at a position sufficiently apart (separated away) from the both ends in the nozzle corresponding direction of the second test image Tk2; in this embodiment, the blank area GA1 is located at a position in the vicinity of a central portion in the nozzle corresponding direction of the printed second test image Tk2.

The second test image Tk2 is printed by using all of nozzles NZ, among the k pieces of the nozzle NZ jetting the K ink, which are different from predetermined pieces of the nozzle NZ located at a position corresponding to the blank area GA1, and without using the nozzles NZ jetting the C, M and Y inks different from the K ink. The second test image Tk2 is printed by using a second partial image data which is a uniform second test image Tk2 included in the test image data TID and which has the specified color having the predetermined target brightness. Namely, the second test image Tk2 is printed by using the second partial image data indicating a second test image Tk2 composed of the specified color. Note that in the test image data TID, data indicating a part or portion corresponding to the blank area GA1 on the paper sheet P is, for example, data indicating the white color.

The concentration (density) of each of printed first test image Tk1, and the printed second test image Tk2 is varied depending on a position within the image, due to any variation in the jetting amounts among the nozzles NZ jetting the K ink and used for the printing, any other variance factor, etc., and the density is not uniform in each of the printed first and second images. The length in the nozzle corresponding direction of each of the printed first and second test images Tk1 and Tk2 is same as the nozzle length NL.

The two test images Tc1, Tc2 corresponding to the C ink, two test images corresponding to the M ink and two test images corresponding to the Y ink (these images are omitted in the drawings) are printed by using nozzles NZ jetting the inks corresponding thereto, respectively. Further, these test images each have a same shape and a same size as those of the two test images Tk1 and Tk2 corresponding to the K ink.

The paper sheet P includes a margin area GA2 located to surround the printable area PA including the 8 test images. Further, the paper sheet P includes, in the printable area PA, a plurality of blank areas GA3 which are adjacent to the plurality of test images in the conveyance corresponding direction (the left-right direction in FIG. 3), and which include, for example, a blank area GA3 arranged between the first test image Tk1 and the second test image Tk2. The margin area GA2 and the blank areas GA3 are each an area indicating the background color of the paper sheet P, similarly to the blank area GA1. Each of the blank areas GA1 and GA3 and the margin area GA2 is referred also to as a "background color area".

In step S20 of FIG. 4, the CPU 210 reads a test original P including a plurality of printed test images (hereinafter referred also to as a "test original P") with the scanner unit 290 to thereby generate a scan data indicating the test original P. The processing in step S20 is executed, for example, in a case that a manufacturer or a user of the multi-function peripheral 200 inputs a reading instruction in a state that the test original P is placed on an original stand of the scanner unit 290. The the scanner unit 290 reads the test original P such that the nozzle corresponding direction (up-down direction of FIG. 3) of the test original P is parallel to the reading direction SD. Here, the reading resolution in the reading direction SD is set to be higher than the resolution in the nozzle direction ND which is determined by the above-described nozzle interval NT (the nozzle corresponding direction of the test original P), for example, set to be two times the resolution of the nozzle direction ND. For example, in this embodiment, since the nozzle interval NT is an interval corresponding to 600 dpi, the reading resolution in the reading direction SD is set to be 1200 dpi. The reason for this setting is to allow at least one or more raster line(s) (to be described later on) in a scan image SI to correspond to one piece of the nozzles NZ.

The view of FIG. 3 indicating the test original P can be also referred to as a view indicating the scan image SI indicated by the generated scan data. The scan image SI includes a plurality of pixels. The plurality of pixels are arranged in a matrix form along the left-right direction and the up-down direction of FIG. 3. As depicted in FIG. 3, the scan image SI includes a plurality of test images including the first test image Tk1 and the second test image Tk2, and the background color area including the blank areas GA1 and GA3 and the margin area GA2. Each of the first test image Tk1 and the second test image Tk2 within the scan image SI includes any variation in the brightness and/or in density included in one of the first test image Tk1 and second test image Tk2 which have been already printed on the test original P.

In the following, when the references are simply made to the first test image Tk1, the second test image Tk2, the blank area GA1 and the margin area GA2, the references mean the first test image Tk1, the second test image Tk2, the blank area GA1 and the margin area GA2 within the scan image SI.

In step S30, the CPU 210 executes an inclination correction processing. In FIG. 3, the left-right direction of the scan image SI is coincident with the conveyance corresponding direction of the test original P indicated within the scan image SI; the up-down direction of the scan image SI is coincident with the nozzle corresponding direction of the test original P indicated within the scan image SI. In practice, there arises an inclination (tilting) to some extent, due to, for example, any inclination of the test original P with respect to the reading direction SD during the reading of the test original P. Accordingly, by the inclination correction processing, the left-right direction of the scan image SI is made to be coincident with the conveyance corresponding direction of the test original P within the scan image SI and the up-down direction of the scan image SI is made to be coincident with the nozzle corresponding direction of the test original P within the scan image SI. The inclination correction processing is, for example, a processing for detecting an edge along the longitudinal direction of the first test image Tk1 within the scan image SI, and for rotating the scan image SI such that the direction of said edge is coincident with the up-down direction of the scan image SI. The inclination correction processing may be executed by a known method different from the above-described method. In the following, the scan data after the inclination correction processing and the scan image SI after the inclination correction processing are simply referred to as a "scan data" and a "scan image SI", respectively, as well. Further, the left-right direction of the scan image SI after the inclination correction processing is referred also to as a "conveyance corresponding direction", and the up-down direction of the scan image SI after the inclination correction processing is referred also to as a "nozzle corresponding direction".

In step S40, the CPU 210 executes a characteristic value generation processing. The characteristic value generation processing is a processing for using the scan data to generate, with respect to the (4×k) pieces of the nozzle of the printing head 21, (4×k) pieces of a characteristic value corresponding respectively to the (4×k) pieces of the nozzle in a one-on-one relationship. Here, an explanation will be given about a processing for calculating characteristic values corresponding to the k pieces of the nozzle NZ for jetting the K ink, by using, among the scan data, data indicating the first and second test images Tk1 and Tk2 for the K ink. Characteristic values corresponding to the k pieces of the nozzle NZ for jetting each of the other inks different from the K ink (namely, the C, M and Y inks) are similarly calculated by using data indicating first and second test images for one of the other inks, as well.

Coordinates corresponding to an i-th pixel in the nozzle corresponding direction from the upper end of each of the test images Tk1 and Tk2 is determined to be "i" ("i" is an integer not less than 1). The coordinates "i" of the upper end of each of the test images Tk1 and Tk2 is 1, and the coordinates "i" of the lower end of each of the test images Tk1 and Tk2 is "Q" ("Q" is an integer not less than 2). In the following, a raster line composed of a plurality of pixels aligned (arranged) in a row along the conveyance corresponding direction in the scan image SI is simply referred to as a "line". A line located at the coordinates "i" in the nozzle corresponding direction is referred to as a "line L(i)", as well. An image indicated by a group of pixels (pixel group) on one specific line L(i) indicates an image on the test original P printed by a nozzle NZ arranged at a location, in the nozzle direction ND, corresponding thereto. Accordingly, in the test images Tk1 and Tk2 within the scan image SI, an image indicated by the group of pixels on the one specific line L(i) indicate an image printed by one nozzle NZ which is included in the k pieces of the nozzle NZ for the K ink and which corresponds to said image. In other words, in the test images Tk1 and Tk2 within the scan image SI, pixels located in same coordinates "i" indicate images which are printed by a same nozzle NZ for the K ink.

Here, areas which are located in the vicinity of the upper end of the plurality of test images, for example, margin-influenced areas 1C and 2C located on the side of the upper ends of the test images Tk1 and Tk2, respectively, include the upper ends of the test images Tk1 and Tk2, respectively, and are adjacent to the margin area GA2 in the nozzle corresponding direction. The values (RGB values) of the pixels of the margin-influenced areas 1C and 2C are influenced by the margin area GA2 and a color in the margin-influenced areas 1C and 2C is influenced by the margin area GA2 and indicates a different color from the color on the test original P. To provide a more specific explanation, a hatched area in the paper sheet P depicted in FIG. 2 indicates an area in which the test images Tk1 and Tk2 are printed on a print surface (a lower surface of FIG. 2) of the paper sheet P. A non-hatched area in the paper sheet P depicted in FIG. 2 indicates an area in which the blank area GA2 is located on the print surface. In a case that a location in the vicinity of the boundary area between the margin area GA2 and the first and second test images Tk1 and Tk2 is read, a reflected light from the blank area GA2 indicated by broken lines in FIG. 2 might be received, in addition to reflected lights from the test images Tk1 and Tk2 indicated by solid lines in FIG. 2, by the photoelectric conversion elements 11. As a result, in the scan image, the values of the pixels of the margin-influenced areas 1C and 2C of the test images Tk1 and Tk2 are likely to indicate a brighter color than the color on the test original P.

Areas which are located in the vicinity of the lower end of the plurality of test images, for example, margin-influenced areas 1D and 2D located on the side of the lower ends of the test images Tk1 and Tk2, respectively, include the lower ends of the test images Tk1 and Tk2, respectively, and are adjacent to the margin area GA2 in the nozzle corresponding direction. Accordingly, similarly to the margin-influenced areas 1C and 2C, the values (RGB values) of the pixels of the margin-influenced areas 1D and 2D are influenced by the margin area GA2, and a color in the margin-influenced areas 1D and 2D is influenced by the margin area GA2 and indicates a different color from the color on the test original P.

Accordingly, for example, in a case of using the values of the pixels of the margin-influenced area 1C and the margin-influenced area 1D so as to calculate the characteristic values corresponding to nozzles NZ printing these areas 1C and 1D (nozzles in the vicinity of the both ends in the nozzle direction ND), there is such a possibility that any appropriate characteristic values might not be calculated. In the characteristic value generation processing of the present embodiment, there are provided various devises or designs (as will be described later on) so as to lower such an inconvenience.

Figure 5:
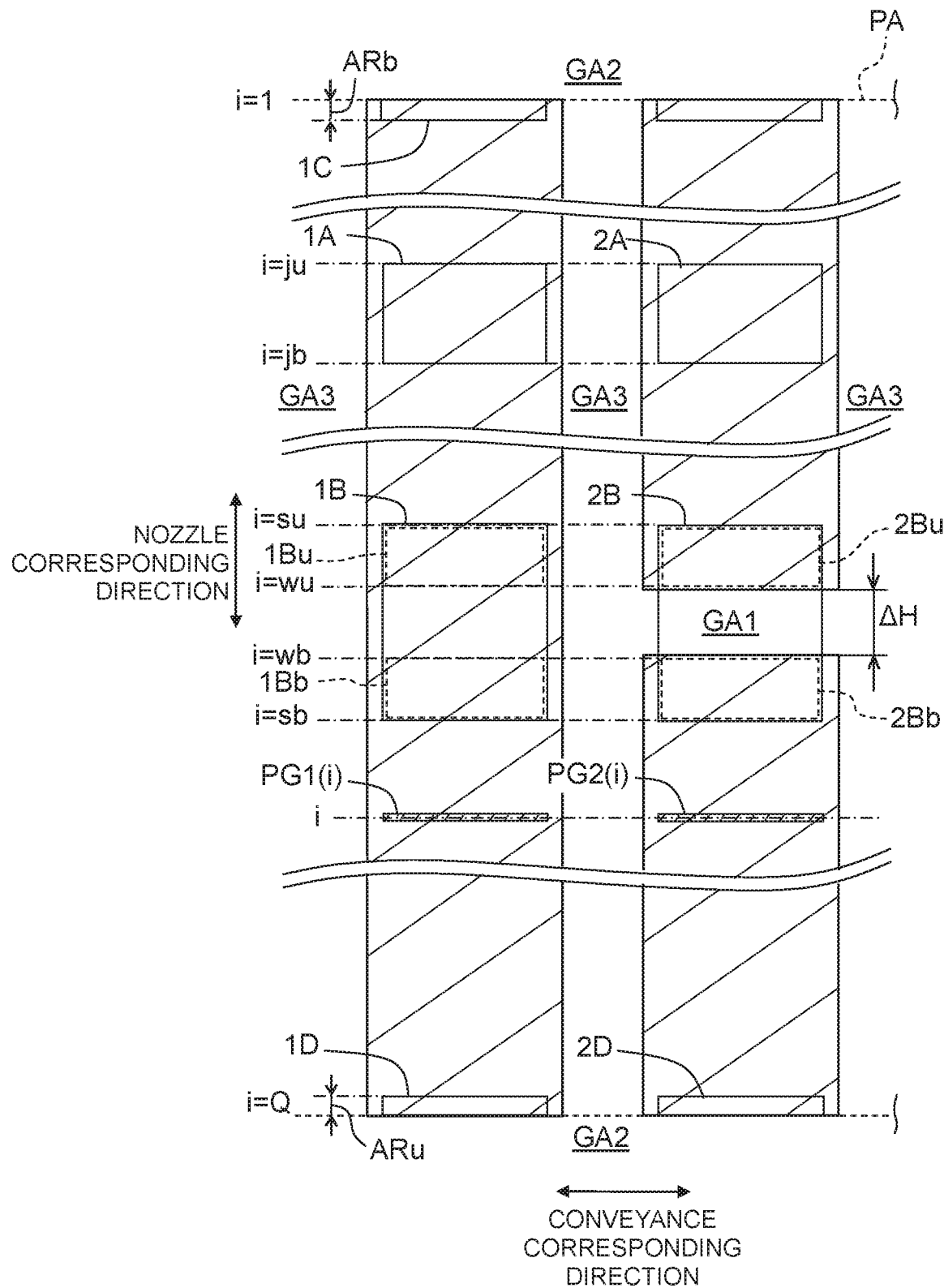
FIG. 5 is an enlarged view depicting a second test image within a scan image.

Areas 1A and 2A within the first and second test images Tk1 and Tk2, respectively, depicted in FIG. 5 are each a non-influenced area which is certainly not influenced by the margin area GA2. The non-influenced areas 1A and 2A of FIG. 5 are each an area which is sufficiently apart (separate) from the margin area GA2 and/or the blank area GA1 in the nozzle corresponding direction, for example, apart from the margin area GA2 and/or the blank area GA1 by not less than 2 cm in the length on the test original P and by not less than 1000 pixels on the scan image SI. In other words, the non-influenced areas 1A and 2A are not adjacent to the background color area in the nozzle corresponding direction, and are adjacent to an area, of the test images Tk1 and Tk2, which is different from the background color area. In the present embodiment, areas which are included in the test images Tk1 and Tk2 and each of which has the coordinates "i" in a range of ju≤i≤jb are set to be the non-influenced areas 1A and 1B. As described above, the range in the nozzle corresponding direction of the first non-influenced area 1A (the non-influenced area 1A of the first test image Tk1) and the range in the nozzle corresponding direction of the second non-influenced area 2A (the non-influenced area 2A of the second test image Tk2) are same with each other.

An area 2B of FIG. 5 is an influence evaluation area which is provided to evaluate the influence by the background color area such as the blank area GA2, etc., and which includes the blank area GA1. The influence evaluation area 2B includes the blank area GA1, an upper adjacent area 2Bu adjacent to the blank area GA1 at the upper side thereof, and a lower adjacent area 2Bb adjacent to the blank area GA1 at the lower side thereof. The lengths in the nozzle corresponding direction of the upper adjacent area 2Bu and the lower adjacent area 2Bb are each set to be sufficiently longer than a range in which the upper adjacent area 2Bu and the lower adjacent area 2Bb might be influenced by the blank area GA1, and are set, for example, to be a length of not less than 5 mm on the test original P, and to be length of not less than 250 pixels on the scan image SI. Since the upper adjacent area 2Bu and the lower adjacent area 2Bb are sufficiently apart from the blank area GA2 which is located at the lower and upper sides thereof, respectively, the upper adjacent area 2Bu and the lower adjacent area 2Bb are not influenced by the blank area GA1 located at the lower and upper sides thereof, respectively.

The area 1B within the first test image Tk1 of FIG. 5 is a compared area which is compared with the influence evaluation area 2B in a case that the influence of the background color area is evaluated. The range in the nozzle corresponding direction of the compared area 1B and the range in the nozzle corresponding area of the influence evaluation area 2B are equal to each other. The compared area 1B includes an upper compared area 1Bu of which range in the nozzle corresponding direction is equal to that of the upper adjacent area 2Bu, and a lower compared area 1Bb of which range in the nozzle corresponding direction is equal to that of the lower adjacent area 2Bb. In the nozzle corresponding direction, the upper compared area 1Bu and the lower compared area 1Bb are not adjacent to the background color area, and are adjacent respectively to an area, which is different from the background color area, in the first test image Tk1. Namely, the upper compared area 1Bu and the lower compared area 1Bb are areas each of which is not influenced by the background color area.

The range in the nozzle corresponding direction of each of the compared area 1B and the influence evaluation area 2B is in a range of su≤i≤wu. Among this range, the range in the nozzle corresponding direction of each of the upper compared area 1Bu and the upper adjacent area 2Bu is in a range of su≤i≤wu; the range in the nozzle corresponding direction of each of the lower compared area 1Bb and the lower adjacent area 2Bb is in a range of wb≤i≤sb.

As appreciated from the above explanation, nozzles NZ used for printing the compared areas 1Bu and 1Bb within the test original P and nozzles NZ used for printing the adjacent areas 2Bu and 2Bb within the test original P are mutually same nozzles (also referred to as "a plurality of first nozzles, first nozzles"). Nozzles NZ used for printing the non-influenced area 1A within the test original P and nozzles NZ used for printing the non-influenced area 2A within the test original P are mutually same nozzles, and are different from the plurality of first nozzles (also referred to as "a plurality of fourth nozzles, fourth nozzles"). Further, nozzles NZ used for printing the margin influence areas 1C and 1D are nozzles which are different from both the first type and fourth type nozzles (also referred to as "a plurality of second nozzles, second nozzles"). Note that in the present embodiment, the plurality of first nozzles and the plurality of fourth nozzles are nozzles which are apart sufficiently from the both ends in the nozzle direction ND, and the plurality of second nozzles are nozzles located in the vicinity of the both ends in the nozzle direction ND.

Here, the brightnesses V_1A, V_2A, V_1B and V_2B of the above-described areas 1A, 2A, 1B, 2B (note that, however, except for the blank area GA1), respectively, within the scan image SI of FIG. 5 can be expressed by the following expressions eq. 1 to eq. 4:

$$V\_1A = D\_k + NA + e1 \quad \text{(eq. 1)}$$

$$V\_2A = D\_k + NA + e2 \quad \text{(eq. 2)}$$

$$V\_1B = D\_k + NB + e1 \quad \text{(eq. 3)}$$

$$V\_2B = D\_k + NA + e2 + S \quad \text{(eq. 4)}$$

Here, "D_k" is brightness corresponding to ideal printing density of the test images Tk1 and Tk2. Further, each of "NA" and "NB" is brightness corresponding to any variation (fluctuation) in the density of one of the test images Tk1 and Tk2, due to any variation in the jetting amount among the nozzles NZ corresponding thereto. Since the variation in the density due to the variation in the jetting amount among the nozzles NZ is different among the nozzles, areas of which locations in the nozzle corresponding direction are different from each other (for example, the areas 1A and 1B) have mutually different values (for example, NA and NB); on the other hand, areas of which locations in the nozzle corresponding direction are same with each other (for example, the areas 1A and 2A) have values which are same with each other (for example, NA). Furthermore, each of "e1" and "e2" is variation in the density due to the variation in the jetting timing among the nozzles NZ while the paper sheet P is being conveyed. Since the variation in the density due to the variation in the jetting timing among the nozzles NZ is different depending on the position in the conveyance direction, areas of which locations in the conveyance corresponding direction are different from each other (for example, the areas 1A and 2A) have mutually different values (for example, e1 and e2); on the other hand, areas of which locations in the conveyance corresponding direction are same with each other (for example, the areas 1A and 1B) have values which are same with each other (for example, e1). Moreover, "S" is brightness corresponding to the influence of the background color area (blank area GA1) while the reading is being performed. Since the areas 1A, 2A and 1B are not adjacent to the background color area, the brightness V_1A, the brightness V_2A and the brightness V_1B do not have the "S". On the other hand, since the upper adjacent area 2Bu and the lower adjacent area 2Bb of the influence evaluation area 2B are adjacent to the blank area GA1, the brightness V_2B of the influence evaluation area 2B includes the "S".

From the above-described expressions (eq. 1) to (eq. 4), difference ΔV_A between the brightness V_2A of the second non-influenced area 2A and the brightness V_1A of the first non-influenced area 1A is expressed by the following expression (eq. 5); difference ΔV_B between the brightness V_2B of the influence evaluation area 2B (upper adjacent area 2Bu of the influence evaluation area 2B) and the brightness V_1B of the compared area 1B is expressed by the following expression (eq. 6).

$$\Delta V\_A = V\_2A - V\_1A = e2 - e1 \quad \text{(eq. 5)}$$

$$\Delta V\_B = V\_2B - V\_1B = e2 - e1 + S \quad \text{(eq. 6)}$$

From the expression eq. 5, it is appreciated that the difference ΔV_A indicates the difference in the variation in density (e2−e1) due to the jetting timing which is generated between the first test image Tk1 and the second test image Tk2. From the expression eq. 6, it is appreciated that the difference ΔV_B indicates the sum of the difference in the variation in density (e2−e1) due to the jetting timing and the influence S of the background color area (blank area GA1) at the time of the reading. Namely, it is appreciated that by subtracting the difference in the variation in density (e2−e1) due to the jetting timing from the difference ΔV_B, it is possible to calculate the influence S of the background color area (blank area GA1) at the time of the reading.

While considering the above-described matters, an explanation will be given about a specific processing of the characteristic value generation processing, with reference to FIG. 6. In step S100, the CPU 210 uses data indicating the first test image Tk1 (also referred to as a "first partial scan data") to thereby calculate average brightness V1_ave(i) of the first test image Tk1 per each line (i). By doing so, Q pieces of the average brightness V1_ave(i) corresponding respectively to Q pieces of the line L(i) in the range of 1≤i≤Q are calculated.

A pixel group PG1(i) as depicted in FIG. 5 is a plurality of pixels which are included in a plurality of pixels on the line L(i) and which are used to calculate the average brightness V1_ave(i) of the first test image Tk1. Here, a plurality of pixels in the vicinity of the both ends in the conveyance corresponding direction of the first test image Tk1 are excluded from (not included in) the pixel group PG1(i). The reason for this exclusion is to avoid using the values of any pixels which are influenced by the blank areas GA3 adjacent to the first test image Tk1 at the both ends in the conveyance corresponding direction of the first test image Tk1. For example, the RGB values of the plurality of pixels included in the pixel group PG1(i) are converted into the brightnesses by using the following conversion expression, and an average value of the brightnesses of the plurality of pixels are calculated. As the expression for converting the RGB values (R, G, B) into the brightness V, for example, the following expression is used:

$$V = 0.299 \times R + 0.587 \times G + 0.114 \times B.$$

Note that the pixel group PG1(i) may include the plurality of pixels in the vicinity of the both ends in the conveyance corresponding direction of the first test image Tk1. This is because, for example, in a case that the lengths in the conveyance corresponding direction of the first test image Tk1 are sufficiently long, it is considered that the influence of the values of the plurality of pixels in the vicinity of the both ends in the conveyance corresponding direction to the average brightness V1_ave(i) is so small enough to be ignorable.

In step S105, the CPU 210 uses data indicating the second test image Tk2 (also referred to as a "second partial scan data") to thereby calculate average brightness V2_ave(i) of the second test image Tk2 per each line (i). By doing so, Q pieces of the average brightness V2_ave(i) corresponding respectively to Q pieces of the line L(i) in the range of 1≤i≤Q are calculated. A pixel group PG2(i) in FIG. 5 is a plurality of pixels which are included in the plurality of pixels on the line L(i) and which are used to calculate the average brightness V2_ave(i) of the second test image Tk2. Here, a plurality of pixels in the vicinity of the both ends in the conveyance corresponding direction of the second test image Tk2 are excluded from the pixel group PG2(i), similarly to the case of the pixel group PG1(i).

Figure 7A:
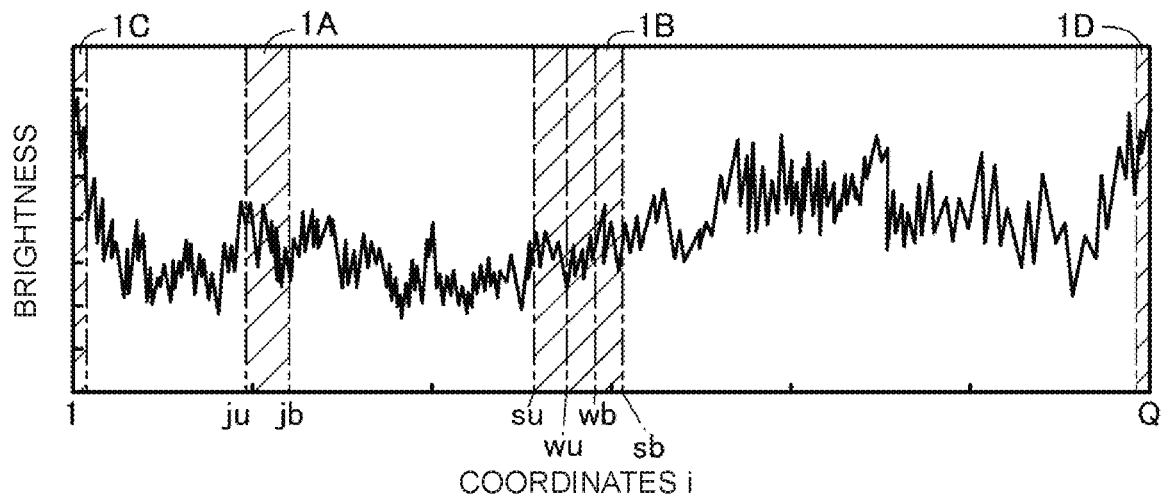
FIGS. 7A and 7B are views indicating brightnesses of test images, respectively.
Figure 7B:
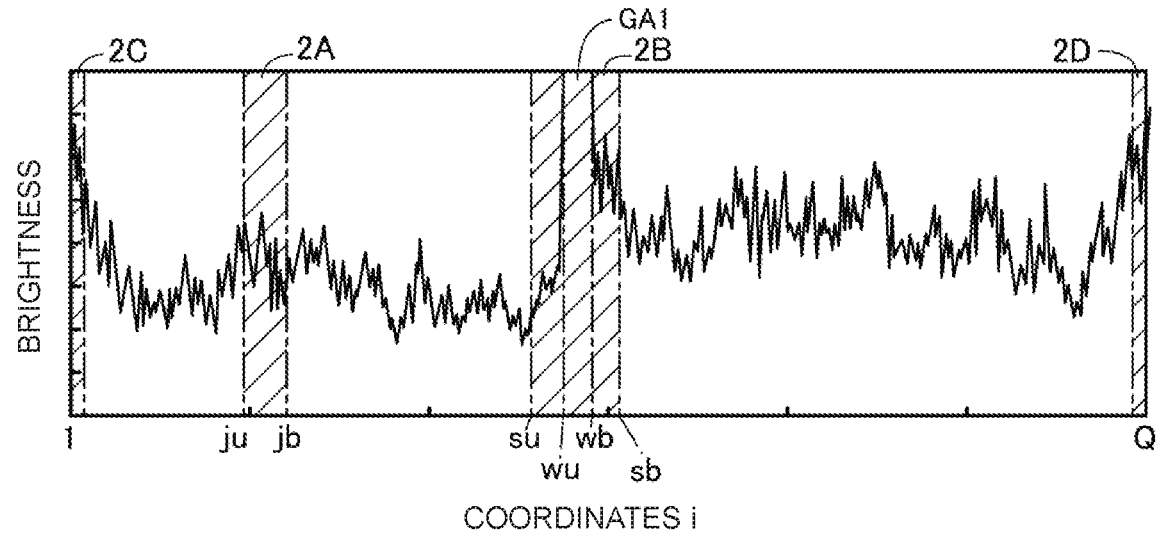

As depicted in FIGS. 7A and 7B, the average brightness V1_ave(i) and the average brightness V2_ave(i) are varied depending on the coordinates i. Further, as depicted in FIG. 7B, the average brightnesses are higher in the blank area GA1 than in a part or portion different from the blank area GA1.

The average brightness V1_Ave(i) can be considered as indicating the brightness of the first test image Tk1 at a location on the test original P which corresponds to the coordinates i; and the average brightness V2_Ave(i) can be considered as indicating the brightness of the second test image Tk2 at the location on the test original P or the brightness of the blank area GA1. Accordingly, among the average brightness V1_ave(i), values in the range of ju≤i≤jb correspond to the brightness V_1A of the non-influenced area 1A of the above-described expression eq. 1, and values in the range of su≤i≤sb correspond to the brightness V_1B of the compared area 1B of the above-described expression eq. 3. Furthermore, among the average value V2_ave(i), the values in the range of ju≤i≤jb correspond to the brightness V_2A of the second non-influenced area 2A of the above-described expression eq. 2. Among the average value V2_ave(i), values in the range of su≤i≤wu and values in the range of wb≤i≤sb correspond to the brightness V_2B of the upper adjacent area 2Bu and the lower adjacent area 2Bb of the influence evaluation area 2B of the above-described expression eq. 4.

In step S110, the CPU 210 calculates the difference between the brightness of the first non-influence area 1A and the brightness of the second non-influenced area 2A (brightness difference) per each line. Namely, with respect to the range of ju≤i≤jb, the CPU 210 calculates difference ΔV_A(i) between the average brightnesses, per each line L(i). As a result, (jb−ju+1) pieces of the difference ΔV_A(i) are calculated. The difference ΔV_A(i) indicates the difference in the variation in density (e2−e1) due to the jetting timing, as indicated in the above-described expression eq. 5.

In step S115, the CPU 210 calculates an average value ΔVAave of the (jb−ju+1) pieces of the difference ΔV_A(i) and standard deviation σ.

In step S120, the CPU 210 uses the average value ΔVAave and the standard deviation σ so as to determine a determining threshold value TH for determining the ranges (widths in the nozzle corresponding direction) of the above-described margin-influenced areas 1C and 1D, respectively. Since the difference in the variation in density (e2−e1) due to the jetting timing occurs at random, the difference in the variation in density (e2−e1) follows the normal distribution. Accordingly, it is appreciated that the difference in the variation in density (e2−e1) falls within a range of {ΔVAave±2×σ} at a probability of not less than 95%. The CPU 210 calculates the value of the {ΔVAave±(2×σ)} as the determination threshold value TH.

In step S125, the CPU 210 calculates the difference between the brightness of the compared area 1B and the brightness of the influence evaluation area 2B (brightness difference) per each line. Namely, with respect to the range of su≤i≤sb, the CPU 210 calculates difference ΔV_B(i) between the average brightnesses, per each line L(i). As a result, (sb−su+1) pieces of the difference ΔV_B(i) are calculated. The difference ΔV_B(i) indicates the sum of the difference in the variation in density (e2−e1) due to the jetting timing and the influence S of the background color at the time of the reading, as indicated by the above-described expression eq. 6.

Figure 8:
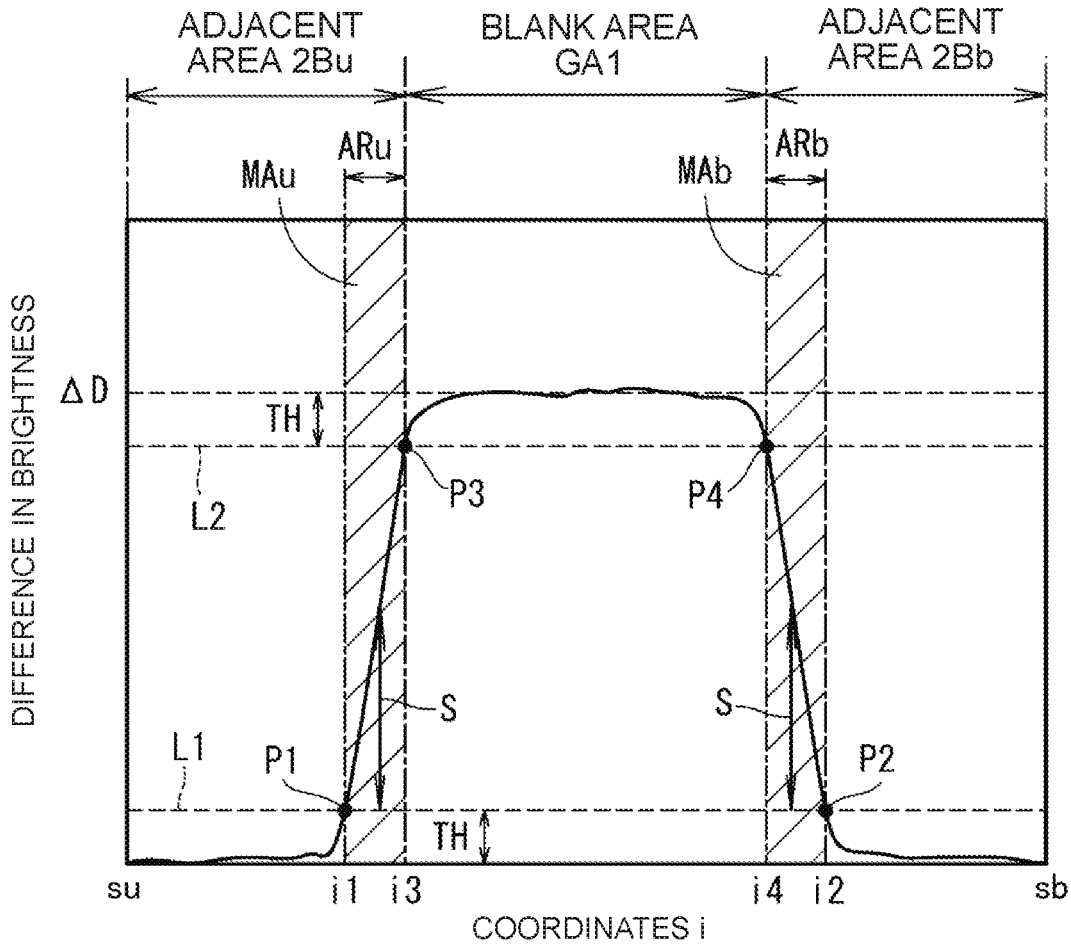
FIG. 8 is a graph indicating difference in brightness $\Delta V\_B(i)$ per each coordinates "i".

FIG. 8 is a graph indicating the difference ΔV_B(i) per each coordinate "i". In the range occupied by the blank area GA1, the difference ΔV_B(i) is the sum of the brightness difference ΔD and the difference in the variation in density (e2−e1) due to the jetting timing. The brightness difference ΔD is a difference between printing density D_k of the test images TK1 and Tk2 and density D_g of the blank area GA1. Among the range of the upper adjacent area 2Bu, in a range sufficiently apart from the blank area GA1, only the difference in the variation in density (e2−e1) due to the jetting timing appears in the difference ΔV_B(i), and the difference ΔV_B(i) is within a range of not more than the above-described determining threshold value TH. This is similarly applicable to a range, among the range of the lower adjacent area 2Bb, which is sufficiently apart from the blank area GA1. Among the ranges occupied by the upper adjacent area 2Bu and the lower adjacent area 2Bb, blank-influenced areas MAu and Mab indicated at hatched portions in FIG. 8 appear, respectively, each in an area adjacent to the blank area GA1. In the blank-influenced areas MAu and Mab, the influence from the blank area GA1 is increased as approaching closely toward the blank area GA1, thereby allowing the difference ΔV_B(i) to be great, and the influence from the blank area GA1 is decreased as separating away from or apart farther from the blank area GA1, thereby allowing the difference ΔV_B(i) to be small.

In step S130, the CPU 210 uses the determining threshold value TH to determine ranges of the blank-influenced areas Mau and Mab. Specifically, the CPU 210 specifies points of intersection (intersection points) P1 and P2 between a line LI indicating the determining threshold value TH and a graph indicating the difference ΔV_B(i) (FIG. 8). Further, the CPU 210 calculates, as the above-described brightness difference ΔD, an average value of a predetermined pieces of the difference DV_B(i) in the vicinity of a central portion of the blank area GA1. Then, the CPU 210 specifies points of intersection (intersection points) P3 and P4 between a line L2 indicating (ΔD−TH) and the graph indicating the difference ΔV_B(i) (FIG. 8). Furthermore, the CPU 210 determines a range from coordinates i1 of the intersection point P1 and coordinates i3 of the intersection point P3 as the blank-influenced area MAu on the upper side (upper blank-influenced area Mau). Moreover, the CPU 210 determines a range from coordinates i4 of the intersection point P4 and coordinates i2 of the intersection point P2 as the blank-influenced area MAb on the lower side (lower blank-influenced area Mab). Here, a width (i3−i1) in the nozzle corresponding direction of the upper blank-influenced area Mau is determined to be a width ARu, and a width (i4−i2)

in the nozzle corresponding direction of the lower blank-influenced area Mab is determined to be a width Arb.

In step S135, the CPU 210 corrects, among values of the average brightness V1_ave(i) (as a plurality of pieces of the average brightness V1_ave(i) calculated regarding the lines L(i), respectively) of the first test image Tk1, the value of the average brightness V1_ave(i) of the margin-influenced area 1C on side of the upper end and the value of the average brightness V1_ave(i) of the margin-influenced area 1D on side of the lower end. Specifically, the CPU 210 determines an area apart from the upper end (i=1) of the first test image Tk1 by a distance or magnitude corresponding to the width ARb of the above-described blank-influenced area MAb, as the margin-influenced area 1C as a target of the correction (FIG. 5). The CPU 210 subtracts the influence S of the background color area from ARb pieces of the average brightness V1_ave(i) (1≤i≤Arb) of the margin-influenced area 1C as the target of the correction, to thereby correct the values of the average brightness V1_ave(i). As appreciated from the above-described expression (6), the influence S of the background color area is a value obtained by subtracting the difference in the variation in density (e2−e1) due to the jetting timing from the difference ΔV_B(i) of FIG. 8. In this embodiment, the value obtained by subtracting the determining threshold value TH which can be considered as the maximum allowable value for the difference in the variation in density (e2−e1) from the difference ΔV_B(i) of FIG. 8 is used as the influence S of the background color area. For example, the influence S in a range of S(i4) to S(i2−1) corresponding to the respective lines from the coordinates i4 to the coordinates (i2−1) of FIG. 8 are used for the influences S of the background color corresponding respectively to the lines from the upper end (i=1) to the lower end (i=ARb) of the margin-influenced area 1C. In such a manner, the influence S of the background color area takes a greater value as approaching toward the upper end of the first test image Tk1, and takes a smaller value as separating away from the upper end.

Figure 9:
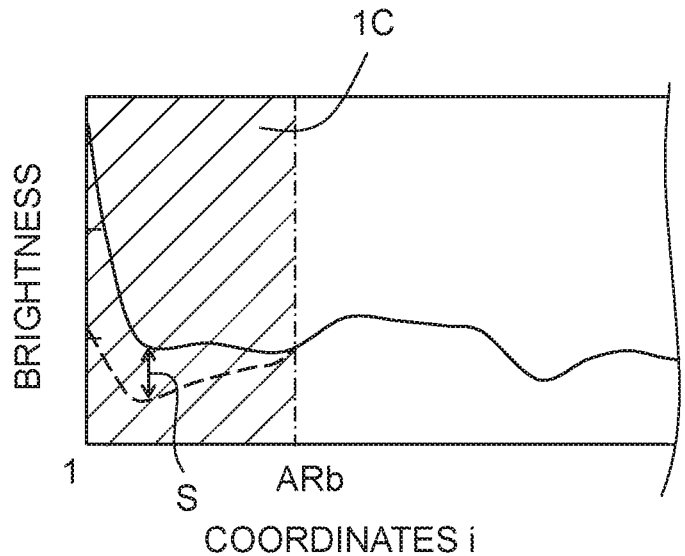
FIG. 9 is a view depicting an example of an average brightness $V1\_ave(i)$ of a first test image before correction and that of the first test image after the correction.

A hatched range in FIG. 9 is the range of the above-described margin-influenced area 1C (range of 1≤i≤Arb). In FIG. 9, solid lines indicate the average brightness V1_ave(i) before the correction, and broken lines indicate the average brightness V1_ave(i) after the correction. By the correction, the average brightness V1_ave(i) which has been made brighter than the original brightness thereof due to the influence of the background color area (margin area GA2) is appropriately corrected and has a brightness closer to the original brightness thereof.

Similarly, the CPU 210 determines an area apart from the lower end (i=Q) of the first test image Tk1 by a distance or magnitude corresponding to the width ARu of the above-described blank-influenced area MAu, as the margin-influenced area 1D as a target of the correction (FIG. 5). The CPU 210 subtracts the influence S of the background color area from ARu pieces of the average brightness V1_ave(i) ((Q−Aru+1)≤i≤Q) of the margin-influenced area 1D as the target of the correction, to thereby correct the values of the average brightness V1_ave(i). For example, the influence S in a range of S(i1+1) to S(i3) corresponding to the respective lines from the coordinates (i1+1) to the coordinates (i3) of FIG. 8 are used for the influences S of the background color corresponding respectively to the lines from the lower end (i=Q) to the upper end (i=(Q−Aru+1)) of the margin-influenced area 1D. In such a manner, the influence S of the background color area takes a greater value as approaching toward the lower end of the first test image Tk1, and takes a smaller value as separating away from the lower end.

In this embodiment, the width ARb of the margin-influenced area 1C is, for example, a width corresponding to 10 to 20 pieces of nozzles, among the k pieces of the nozzle NZ, which are arranged in the vicinity of one end in the nozzle direction ND (the upper end in FIG. 3). Similarly, the width ARu of the margin-influenced area 1D is, for example, a width corresponding to 10 to 20 pieces of nozzles, among the k pieces of the nozzle NZ, which are arranged in the vicinity of the other end in the nozzle direction ND (the lower end in FIG. 3). In other words, among the k pieces of the nozzle NZ, areas each printed by 10 to 20 pieces of nozzles at one of the both ends in the nozzle direction ND are influenced by the margin area GA2; thus, the average brightness V1_ave(i) corresponding to each of these nozzles is appropriately corrected by using the influence S of the background color area. Further, among the k pieces of the nozzle NZ, remaining nozzles NZ which are different from (excluding) the 10 to 20 pieces of the nozzle NZ each on the both ends in the nozzle direction ND are not influenced by the margin area GA2. Therefore, the average brightness V1_ave(i) corresponding to each of these remaining nozzles NZ is not corrected.

Figure 6:
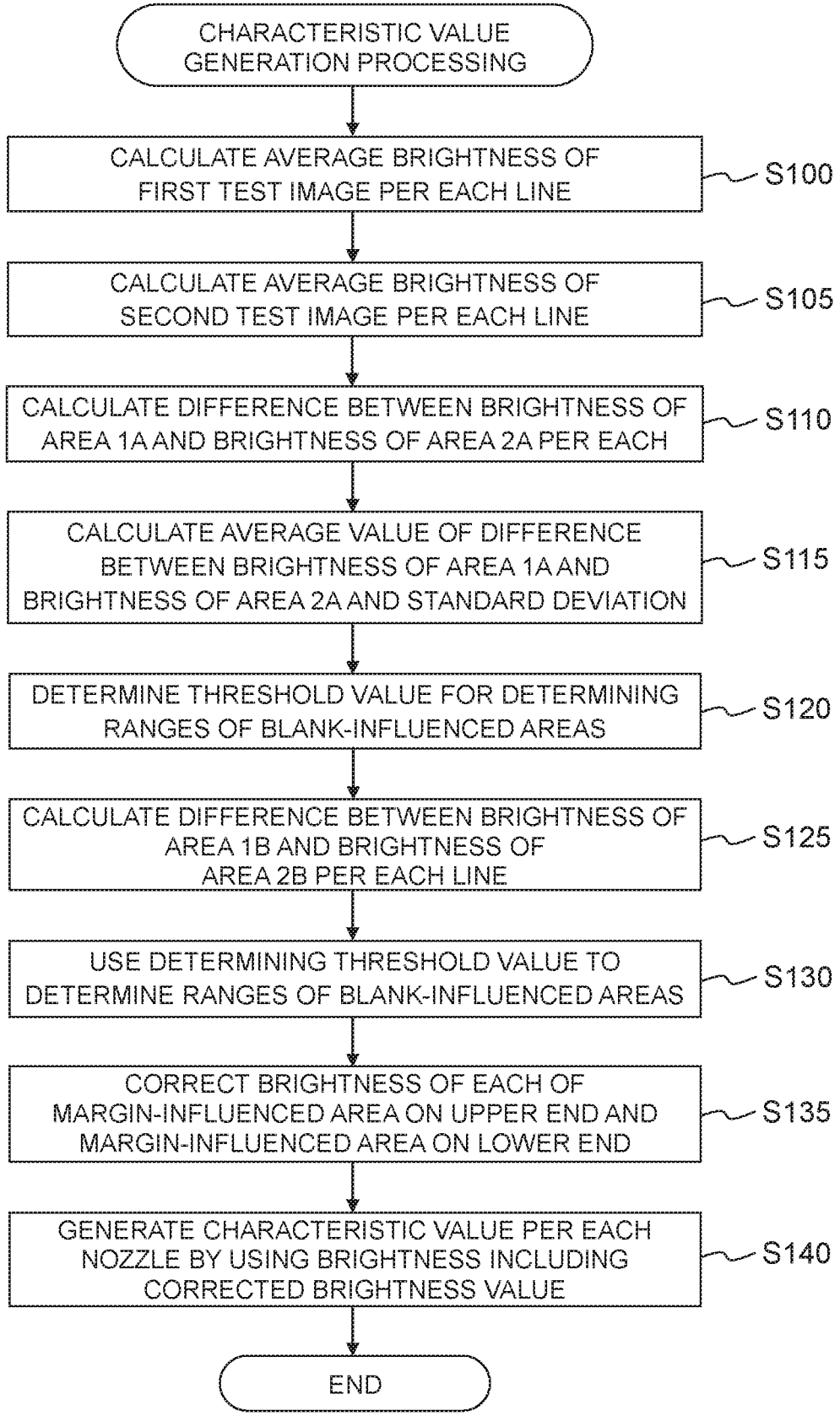
FIG. 6 is a flow chart of a characteristic value generation processing.

In step S140 of FIG. 6, the CPU 210 generates k pieces of the characteristic value corresponding to k pieces of the nozzle NZ jetting the K ink by using the average brightness V1_ave(i), including the corrected average brightness V1_ave(i), of the first test image Tk1. For example, the CPU 210 determines brightness V_NZ(p) corresponding to a nozzle NZ(p) for each of the k pieces of the nozzle NZ. Here, "p" is, for example, a nozzle number assigned to each of k pieces of the nozzle NZ from the upper end to the lower end of FIG. 3, and is an integer in a range of 1≤p≤k indicating the position of each of the k pieces of the nozzle NZ in the nozzle direction ND.

For example, an average brightness V1_ave(i) having a position (coordinates i) in the nozzle corresponding direction corresponding to the position in the nozzle direction ND of the nozzle NZ(p) is determined as a brightness V_NZ(p) corresponding to the nozzle NZ(p). In this embodiment, the resolution (1200 dpi) in the nozzle corresponding direction of the scan image SI is two times the resolution (600 dpi) corresponding to the nozzle interval NT. Accordingly, for example, a line corresponding to a p-th nozzle NZ from the upper end in the nozzle direction ND is a 2p-th (i=2p) line from the upper end in the conveyance corresponding direction. Therefore, for example, the brightness V_NZ(p) corresponding to the p-th nozzle NZ from the upper end in the nozzle direction ND is an average brightness N1_ave(2p).

The CPU 210 converts the k pieces of the brightness V_NZ(p) corresponding to the k pieces of the nozzle NZ into k pieces of density value DV_NZ(p) each of which indicates a higher density as the value thereof becomes larger. The CPU 210 calculate difference ΔDV(p) between the density value DV_NZ(p) and a reference density value DV_ref for each of the k pieces of density value DV_NZ(p). The reference density value DV_ref is, for example, a value indicating the lowest density among the k pieces of the density value DV_NZ(p). The k pieces of the difference ΔDV(p) corresponding to the k pieces of the nozzle NZ, respectively, are determined as k pieces of the characteristic value corresponding to the k pieces of the nozzle NZ, respectively.

The characteristic value generation processing as described above is executed for each of the nozzles NZ jetting one of the C, M, Y and K inks, and k pieces of the characteristic value corresponding to each k pieces of the nozzles NZ jetting one of C, M, Y and K inks are generated.

FIG. 10 is a view depicting an example of a characteristic value table PT in which the characteristic values for each of the nozzles jetting one of the C, M, Y and K inks are stored. The characteristic value table PT of FIG. 10 includes four sub tables for the C, M, Y and K nozzles. In each of the four sub tables, k pieces of the characteristic value each of which is stored therein while being caused to correspond to the nozzle number. For example, the CPU 210 generates the characteristic value table PT and stores the generated characteristic value table PT in the non-volatile memory unit 230.

The characteristic values stored in the characteristic value table PT are used, for example, so as to execute a compensating processing for compensating the variation in the ink jetting amount among the nozzles in a case of generating printing data for causing the printer unit 280 of the multi-function peripheral 200 to execute printing. With this, in a printed image which is printed by using the printing data, it is possible to suppress the occurrence of any unevenness in the density due to the variation in the jetting amount among the nozzles NZ. The generation processing of the print data including the compensating processing is disclosed, for example, in Japanese Patent Application Laid-open No. 2011-131428.

According to the embodiment as explained above, the scan image SI includes: the compared areas 1Bu and 1Bb which are included in th first test image Tk1 and which are not adjacent in the nozzle corresponding direction to the background color area; the upper adjacent area 2Bu and the lower adjacent area 2Bb which are included in the second test image TK2 and which are adjacent in the nozzle corresponding direction to the blank area GA1 as the background color area; and the margin-influenced areas 1C and 1D which are adjacent in the nozzle corresponding direction to the margin area GA2 as the background color area. The CPU 210 evaluates the difference between the colors of the compared areas 1Bu and 1Bb and the colors of the adjacent areas 2Bu and 2Bb, respectively, based on the values of the pixels within the compared areas 1Bu and 1Bb and the values of the pixels within the adjacent areas 2Bu and 2Bb. In other words, the CPU 210 evaluates and calculates the influence S of the background color area (steps S100 to S130 in FIG. 6). Then, the CPU 210 uses the result of the evaluation (influence S of the background color area) and the average brightness V1_ave(i) based on the values of the pixels within the margin-influenced areas 1C and 1D to thereby generate characteristic values corresponding respectively to nozzles printing each of the margin-influenced areas 1C and 1D (S135, S140).

According to the above-described configuration, the evaluation is performed regarding the difference between the colors of the compared areas 1Bu and 1Bb which are not adjacent to the background color area in the nozzle corresponding direction and the colors of the adjacent areas 2Bu and 2Bb which are adjacent to the blank area GA1 as the background area in the nozzle corresponding direction. Further, the result of the evaluation and the values of the pixels in the margin-influenced areas 1C and 1D are used so as to generate the characteristic values corresponding respectively to the nozzles printing each of the margin-influenced areas 1C and 1D. As a result, in a case of generating, by using the scan data, the characteristic values indicating the jetting characteristics of the nozzles NZ, it is possible to generate appropriate characteristic values while considering the influence of the background color of the paper sheet P. For example, it is possible to suppress the occurrence of such a situation that the characteristic value corresponding to each of the nozzles NZ printing one of the margin-influenced areas 1C and 1D become to be a value indicating a jetting amount which is smaller than an originally adequate jetting amount of the nozzle NZ, due to the influence of the white color as the background color of the paper sheet P. Further, the background color of the paper sheet P may be different depending on the kind of the paper sheet, for example, may be different between a plain paper sheet and a glossy paper sheet. Therefore, the influence of the background color area of the paper sheet P may also be different depending on the kinds of the paper sheet P. In the present embodiment, it is possible to generate appropriate characteristic values which are different for the kinds of the paper sheet, respectively, by performing the printing of the test image on a paper sheet P which is to be used in the actual printing to thereby execute the above-described image processing.

More specifically, the CPU 210 uses the values of the pixels within the compared areas 1Bu and 1Bb so as to calculate the plurality of pieces of the average brightness V1_ave(i) as the values regarding the colors of the compared areas 1Bu and 1Bb, respectively (S100). The CPU 210 uses the values of the pixels within the adjacent areas 2Bu and 2Bb so as to calculate the plurality of pieces of the average brightness V2_ave(i) as the values regarding the colors of the adjacent areas 2Bu and 2Bb, respectively (S105). The CPU 210 calculates the plurality of pieces of the difference ΔV_B(i) respectively between the plurality of pieces of the average brightness V1_ave(i) of the compared areas 1Bu and 1Bb and the plurality of pieces of the average brightness V2_ave(i) of the adjacent areas 2Bb and 2Bu (S125). As a result, it is possible to appropriately evaluate the difference between the colors of the compared area 1Bu and 1Bb and the colors of the adjacent areas 2Bb and 2Bu.

Further, in the embodiment, the printer unit 280 is a so-called line printer which does not involve any main scanning. In the line printer, it is not possible to perform printing at an outside area, of a paper sheet, located outside of nozzles NZ which are included in the k pieces of the nozzle NZ and which are located on the both ends in the nozzle direction ND. Accordingly, a test image using the nozzles NZ located at the both ends have to be adjacent to the margin area GA2. According to the embodiment, it is possible to generate appropriate characteristic values for such a line printer.

Furthermore, in the embodiment, the characteristic values corresponding to the nozzles located at the ends in the nozzle direction ND of the line printer (characteristic values of the nozzles printing each of the margin-influenced areas 1C and 1D) are generated by using the result of the evaluation of difference between the colors of the compared areas 1Bu and 1Bb and the colors of the adjacent areas 2Bu and 2Bb. As a result, it is possible to appropriately generate the characteristic values corresponding to the nozzles located at the ends in the nozzle direction ND of the line printer, while considering the influence by the background color of the paper sheet.

Moreover, regarding the scan image SI in the embodiment, the characteristic values corresponding to the nozzles NZ which are included in the k pieces of the nozzle NZ and which are located at positions different from the nozzles NZ (the above-mentioned plurality of second nozzles) printing the margin-influenced areas 1C and 1D are generated without using the result of the evaluation of the difference between the colors of the compared areas 1Bu and 1Bb and the colors of the adjacent areas 2Bu and 2Bb (for example, the difference ΔV_B(i) and the influence S by the background color area based on the difference ΔV−B(i)). As a result, the characteristic values corresponding to the nozzles NZ located at positions apart from the end(s) in the nozzle direction ND can be appropriately generated, without considering the influence of the background color area of the paper sheet P. Here, among the k pieces of the nozzle NZ, nozzles NZ which do not include the nozzles NZ printing the margin-influenced areas 1C and 1D (the above-described plurality of second nozzles), namely, the nozzles for which the characteristic values corresponding thereto, respectively, are generated without using the result of the evaluation of the difference between the colors of the compared areas 1Bu and 1Bb and the colors the adjacent areas 2Bu and 2Bb are referred also to as "a plurality of third nozzles, third nozzles".

Here, a plurality of nozzles (for example, 10 to 20 pieces of the nozzle) printing the margin-influenced area 1C include one nozzle located at the upper end in the nozzle direction ND (for example, a nozzle of the nozzle number one) and another nozzle (for example, a nozzle of the nozzle number three) which is apart (separated away) from the upper end in the nozzle direction ND than (as compared with) the one nozzle. As the influence S of the background color area corresponding to each of the lines from the upper end (i=1) to the lower end (i=ARb) of the margin-influenced area 1C depicted in FIG. 9, influences S(i4) to S(i2−1) corresponding respectively to lines from the coordinates i4 to (i2−1) as depicted in FIG. 8 are used. As described above, the influence S of the background color area (the result of the evaluation of the difference between the colors of the compared areas 1Bu and 1Bb and the colors of the adjacent areas 2Bu and 2Bb) has a greater value as approaching closer to the upper end of the first test image Tk1 (the position i=1 of FIG. 9), and has a smaller value as separating farther from the upper end (FIG. 9). From this, it is appreciated that the contribution of the influence S of the background color area to the above-described one nozzle (for example, the nozzle of the nozzle number one) is greater than the contribution of the influence S of the background color area to the another nozzle (for example, the above-described nozzle of the nozzle number three). As described above, it is possible to generate the characteristic values regarding each of which the influence S of the background color area is appropriately considered, depending on the distance from the upper end in the nozzle direction ND.

Further, the blank area GA1 dividing the second test image Tk2 into two parts is located in the inside of the printable area PA in the test original P (FIGS. 3 and 5). In other words, the blank area GA1 is located at an area in the inside of the scan image Si corresponding to the printable area PA. Accordingly, since the blank area GA1 is appropriately arranged in the scan image SI, it is possible to easily compare the compared area 1B and the influence evaluation area 2B including the blank area GA1. Therefore, it is possible to easily generate appropriate characteristic values regarding which the influence of the background color of the paper sheet P is considered.

Further, in the scan image Si of the above-described embodiment, the area indicating the first test image Tk1 including the compared areas 1Bu and 1Bb and the margin influence area 1C, and the area indicating the second test image Tk2 including the adjacent areas 2Bu and 2Bb and the blank area GA1 are arranged side by side in the conveyance corresponding direction perpendicular to the nozzle corresponding direction (FIGS. 3 and 5). In such a manner, since the compared areas 1Bu and 1Bb, the margin influenced area 1C, the adjacent areas 2Bu and 2Bb, and the blank area GA1 are appropriately arranged within the scan image SI, the characteristic values regarding which the influence of the background color area of the paper sheet P is considered can be easily generated.

Further, specifically, the scan image SI includes the first non-influenced area 1A which is not adjacent to the background color area in the nozzle corresponding direction and which is adjacent to a part or portion, included in the first test image Tk1 and different from the background color area, in the nozzle corresponding direction; and the second non-influenced area 2A which is not adjacent to the background color area in the nozzle corresponding direction and which is adjacent to a part or portion, included in the second test image Tk2 and different from the background color area, in the nozzle corresponding direction. The CPU 210 evaluates the difference between the color of the first non-influenced area 1A and the color of the second non-influenced area 2A based on the values of the pixels within the first non-influenced area 1A and the values of the pixels within the second non-influenced area 2A (S110 of FIG. 6). Specifically, the difference between the brightness of the first non-influenced area 1A and the brightness of the second non-influenced area 2A is calculated per each line L(i). Further, by using the result of the evaluation, the difference between the colors of the compared areas 1Bu and 1Bb and the colors of the adjacent areas 2Bu and 2Bb are evaluated (the influence S of the background color area is evaluated). As a result of this, by removing or subtracting the difference in the variation in density (e2−e1) due to the jetting timing from the difference ΔV_B, it is possible to evaluate the influence S of the background color area further appropriately. Accordingly, it is possible to generate the characteristic values regarding which the influence S of the background color area of the paper sheet P is considered further appropriately.

As appreciated from the foregoing explanation, the nozzle direction ND of the embodiment is an example of the first direction, and the nozzle corresponding direction of the original P is an example of the second direction. The entirety of the test images Tk1 and Tk2 within the test original P of the embodiment is an example of the specific color image. The compared areas 1Bu and 1Bb within the scan image SI are an example of the first specific color area, and the adjacent areas 2Bu and 2Bb within the scan image SI are an example of the second specific color area. The margin influenced area 1C within the scan image SI is an example of the third specific color area, and whole remaining area, which is included in the test image Tk1 within the scan image SI and which is different from the margin influenced area 1C, is an example of the fourth specific color area. The first non-influenced area 1A within the scan image SI is an example of the fifth specific color area, and the second non-influenced area 2A within the scan image SI is an example of the sixth specific color area. The area indicating the first test image Tk1 within the scan image SI is an example of the first partial area, and the area indicating the second test image Tk2 within the scan image SI is an example of the second partial area.

<First Modifications>

In the above-described embodiment, a line printer is adopted as the printer unit 280 of the multi-functional peripheral 200. Instead of this, it is allowable to adopt a serial printer in which a plurality of nozzles NZ are arranged in a printing head along the conveyance direction, and which causes the printing head to perform main scanning in a main scanning direction crossing the conveyance direction. In the serial printer, the nozzle direction and the conveyance direction are parallel to each other. Also in this case, under a condition that an area for which printing is performed by using nozzles included in the plurality of nozzles and located at an end portion in the nozzle corresponding direction is adjacent to a background color area in the nozzle corresponding direction in the test image, an image processing similar to that executed in the embodiment may be executed.

<Second Modification>

In the above-described embodiment, the average brightness is used as the value regarding the color of each of the respective areas within the first and second test images Tk1 and Tk2. It is allowable, however, to use another value which is different from the average brightness and which is based on the values (RGB values) of the pixels within each of the areas. For example, in a case of calculating the characteristic values of each of the C, M and Y nozzles, it is allowable to calculate, per each line, the average value of each of a C component value, a M component value and a Y component value by using the values (RGB values) of the pixels within each of the areas, instead of the average brightness.

<Third Modification>

In the above-described embodiment, the difference between the color of the first non-influenced area 1A and the color of the second non-influenced area 2A are evaluated to thereby calculate the determining threshold value TH (S110 to S120 in FIG. 6). Instead of doing so, it is allowable to omit the steps S110 to S120. In such a case, the determining threshold value TH may be, for example, a fixed value previously included in the computer program PG.

<Fourth Modification>

The shape of the second test image Tk2 of the above-described embodiment is not limited to or restricted by the shape depicted in FIGS. 3 and 5. For example, since the values of the pixels within the margin influenced areas 2C and 2D of the second test image Tk2 are not used, the both ends in the nozzle corresponding direction of the second test image Tk2 may be separated away from the both ends in the nozzle corresponding direction of the printable area PA. Namely, the length in the nozzle corresponding direction of the second test image Tk2 may be shorter than the nozzle length NL.

<Fifth Modification>

In the above-described embodiment, the test image is printed by using the printer unit 280 of one piece of the multi-function peripheral 200 to thereby prepare the test original P (S10 of FIG. 4), and the scan data is generated by reading the test original P with the scanner unit 290 of the multi-function peripheral 200 (S20 of FIG. 4). Instead of doing so, it is allowable to print the test image by using one piece of a printer, and to generate the scan data by using a scanner separate from the one piece of the printer.

<Sixth Modification>

The inclination correction processing in step S30 of FIG. 4 and the characteristic value generation processing of step S40 may be executed, for example, by a calculator which is separate from the multi-function periphery 200 and the scanner separate from the multi-function periphery 200. For example, the characteristic value generation processing may be executed by the terminal apparatus 100 such as a smart phone, a personal computer, etc., used by the user of the multi-functional periphery 200. Further, the characteristic value generation processing may be executed by a server connected to the multi-function periphery 200 and operated, for example, by the manufacturer of the multi-functional peripheral 200. In these cases, for example, it is also allowable that the characteristic value generation processing may be executed by the terminal apparatus 100 such as a smart phone, a personal computer, etc., used by a user. In this case, it is allowable that for example, the terminal apparatus 100 or the server supplies the test image data TID to the multi-function periphery 200 and that the multi-function periphery 200 uses the test image data TID so as to print the test image on the paper sheet P. Further, it is allowable that the terminal apparatus 100 or the server obtains the scan data generated in the multi-function periphery 200 and uses the scan data to execute the characteristic value generation processing.

<Seventh Modification>

Furthermore, it is allowable that a plurality of computers which are capable of communicating with each other via a network (for example, a cloud server) each share one of the functions required for the characteristic value generation processing, and execute, as a whole, the characteristic value generation processing. In this case, the entirety of the plurality of computers is an example of the image processing apparatus.

<Eighth Modification>

In each of the embodiment and modification thereof, a part or portion of the configuration realized by the hardware may be replaced by a software; conversely, a part or the entirety of the configuration realized by the software may be replaced by the hardware.

Although the present teaching has been explained as above regarding the embodiment and modifications, the embodiment and modifications are provided so that the present teaching can be understood easily, but not provided so as to limit the present teaching in any way. The present teaching can be changed, modified and improved, without departing from the spirit and/or gist of the present teaching and the range of the claims, and the present teaching includes any equivalents thereof.

What is claimed is:

1. An image processing apparatus for a printing apparatus which is configured to perform printing by using a plurality of nozzles, the plurality of nozzles being located at mutually different positions from each other in a first direction and the plurality of nozzles including a first nozzle and a second nozzle, the image processing apparatus comprising a controller configured to perform:
acquiring scan data indicating a scan image; and
generating a plurality of parameters corresponding to the plurality of nozzles, respectively, by using the scan data, each of the plurality of parameters indicating jetting characteristic of a coloring material from one of the plurality of nozzles corresponding thereto,
wherein the scan data is generated by optically reading a sheet on which a specific color image represented by a specific color has been printed by the printing apparatus,
wherein the specific color image is printed on the sheet by using a specific color image data indicating the specific color image,
wherein the scan image includes:
a first specific color area, the first specific color area indicating a first part included in the specific color image and being printed by using the first nozzle, the first specific color area comprising pixels that are located separately, in a second direction parallel to the first direction in the printing apparatus, from a background color area indicating a background color of the sheet;

a second specific color area, the second specific color area indicating a second part included in the specific color image and being printed by using the first nozzle, the second specific color area comprising pixels that are located adjacent, in the second direction, to the background color area indicating the background color of the sheet, a distance in the second direction from the background color area of the sheet to the pixels of the first specific color area of the sheet being larger than a distance in the second direction from the background color area of the sheet to the pixels of the second specific color area of the sheet, wherein the first part being printed by using the first nozzle and the second part being printed by using the first nozzle are located in the same coordinates in the second direction within the scan image; and a third specific color area, the third specific color area indicating a third part included in the specific color image and being printed by using the second nozzle, the third specific color area comprising pixels that are located adjacent, in the second direction, to the background color area indicating the background color of the sheet, the third specific color area indicating the third part including a pixel located at an end of the specific color image in the second direction, and wherein in a case that the controller performs generating the plurality of parameters, the controller is configured to perform:

evaluating a difference between a color of the first part being printed by using the first nozzle and a color of the second part being printed by using the first nozzle, based on a value of a first pixel within the first specific color area and a value of a second pixel within the second specific color area; and generating a parameter included in the plurality of parameters and corresponding to the second nozzle, by using a result of the evaluation of the difference between the color of the first part and the color of the second part and a value of a third pixel within the third specific color area.

2. The image processing apparatus according to claim 1, wherein in a case that the controller performs generating the difference between the color of the first part and the color of the second part, the controller is configured to perform:

calculating a first value regarding the color of the first specific color area by using values of a plurality of pieces of the first pixel;

calculating a second value regarding the color of the second specific color area by using values of a plurality of pieces of the second pixel; and calculating difference between the first and second values.

3. The image processing apparatus according to claim 1, wherein the first direction is a direction crossing a conveyance direction of a printing medium, and wherein the printing apparatus performs printing on the printing medium without moving the plurality of nozzles in the first direction with respect to the printing medium.

4. The image processing apparatus according to claim 3, wherein the plurality of nozzles further include a third nozzle which is apart from an end of the plurality of nozzles in the first direction, wherein the scan image further includes a fourth specific color area, the fourth specific color area indicating a fourth part included in the specific color image and being printed by using the third nozzle, the fourth specific color area comprising pixels that are adjacent, in the second direction, to an area in the specific color image different from the background color area, and the fourth specific color area comprises pixels that are separated from the background color area in the second direction, and wherein the controller is configured to perform generating a parameter included in the plurality of parameters and corresponding to the third nozzle by using a value of a fourth pixel within the fourth specific color area, but without using the result of the evaluation of the difference between the color of the first part and the color of the second part.

5. The image processing apparatus according to claim 3, wherein the second nozzle is located at an end of the plurality of nozzles in the first direction.

6. The image processing apparatus according to claim 5, wherein the second nozzle located at the end in the first direction is among a plurality of second nozzles, and the plurality of second nozzles includes a second nozzle A and a second nozzle B apart from the end in the first direction farther than the first nozzle A, and wherein an extent of contribution of the result of the evaluation of the difference between the color of the first part and the color of the second part to a parameter included in the parameters and corresponding to the second nozzle A is greater than an extent of contribution of the result of the evaluation of the difference between the color of the first part and the color of the second part to a parameter included in the parameters and corresponding to the second nozzle B.

7. The image processing apparatus according to claim 1, wherein the background color area that are adjacent to the pixels of the second specific color area in the second direction are located at an area, within the scan image, corresponding to an area, on the paper sheet, on which the printing is performable by using the plurality of nozzles.

8. The image processing apparatus according to claim 7, wherein the scan image further includes:

a first partial area indicating a part, of the specific color image, including the first specific color area and the third specific color area; and a second partial area indicating a part, of the specific color image, including the second specific color area and the background color area, the background color area being adjacent to the second specific color area in the second direction, and wherein the first partial area and the second partial area are arranged side by side in a direction perpendicular to the second direction.

9. The image processing apparatus according to claim 1, wherein the plurality of nozzles further include a fourth nozzle;

wherein the scan image further includes:

a fifth specific color area, the fifth specific color area indicating a fifth part included in the specific color image and being printed by using the fourth nozzle, the fifth specific color area comprising pixels that are adjacent, in the second direction, to an area in the specific color image different from the background color area, and the fifth specific color area comprising pixels that are separated from the background color area in the second direction; and a sixth specific color area, the sixth specific color area indicating a sixth part included in the specific color image and being printed by using the fourth nozzle, the sixth specific color area comprising pixels that are adjacent, in the second direction, to the area in the specific color area different from the background color area, and the sixth specific color area comprising pixels that are separated from the background color area in the second direction, and wherein the controller is configured to perform:
evaluating difference between a color of the fifth specific color area and a color of the sixth specific color area based on a value of a fifth pixel within the fifth specific color area and a value of a sixth pixel within the sixth specific color area, and evaluating the difference between the color of the first part and the color of the second part, by using a result of the evaluation of the difference between the color of the fifth specific color area and the color of the sixth specific color area.

10. A non-transitory computer-readable medium storing an image processing program for a printing apparatus which is configured to perform printing by using a plurality of nozzles, the plurality of nozzles being located at mutually different positions from each other in a first direction and the plurality of nozzles including a first nozzle and a second nozzle, the computer program causing a computer to perform:

acquiring scan data indicating a scan image; and generating a plurality of parameters corresponding to the plurality of nozzles, respectively, by using the scan data, each of the plurality of parameters indicating jetting characteristic of a coloring material from one of the plurality of nozzles corresponding thereto, wherein the scan data is generated by optically reading a sheet on which a specific color image represented by a specific color has been printed by the printing apparatus, wherein the specific color image is printed on the sheet by using a specific color image data indicating the specific color image, wherein the scan image includes:
a first specific color area, the first specific color area indicating a first part included in the specific color image and being printed by using the first nozzle, the first specific color area comprising pixels that are located separately, in a second direction parallel to the first direction in the printing apparatus, from a background color area indicating a background color of the sheet;

a second specific color area, the second specific color area indicating a second part included in the specific color image and being printed by using the first nozzle, the second specific color area comprising pixels that are located adjacent, in the second direction, to the background color area indicating the background color of the sheet, a distance in the second direction from the background color area of the sheet to the pixels of the first specific color area of the sheet being larger than a distance in the second direction from the background color area of the sheet to the pixels of the second specific color area of the sheet, wherein the first part being printed by using the first nozzle and the second part being printed by using the first nozzle are located in the same coordinates in the second direction within the scan image; and a third specific color area, the third specific color area indicating a third part included in the specific color image and being printed by using the second nozzle, the third specific color area comprising pixels that are located adjacent, in the second direction, to the background color area indicating the background color of the sheet, the third specific color area indicating the third part including a pixel located at an end of the specific color image in the second direction, and wherein in a case that the computer program causes the computer to perform generating the plurality of parameters, the computer program causes the computer to perform:

evaluating a difference between a color of the first part being printed by using the first nozzle and a color of the second part being printed by using the first nozzle, based on a value of a first pixel within the first specific color area and a value of a second pixel within the second specific color area; and generating a parameter included in the plurality of parameters and corresponding respectively to the second nozzle, by using a result of the evaluation of the difference between the color of the first part and the color of the second part and a value of a third pixel within the third specific color area.

* * * * *